(12) United States Patent
Bronchain et al.

(10) Patent No.: US 12,499,277 B2
(45) Date of Patent: Dec. 16, 2025

(54) FLEXIBLE HARDWARE ACCELERATORS FOR MASKING CONVERSIONS WITH A POWER OF TWO MODULUS

(71) Applicant: NXP B.V., Eindhoven (NL)

(72) Inventors: Olivier Bronchain, Brussels (BE); Tobias Schneider, Styria (AT)

(73) Assignee: NXP B.V., Eindhoven (NL)

( * ) Notice: Subject to any disclaimer, the term of this patent is extended or adjusted under 35 U.S.C. 154(b) by 410 days.

(21) Appl. No.: 18/298,100

(22) Filed: Apr. 10, 2023

(65) Prior Publication Data

US 2024/0338492 A1 Oct. 10, 2024

(51) Int. Cl.
*G06F 21/72* (2013.01)
*G06F 7/504* (2006.01)
*H04L 9/08* (2006.01)

(52) U.S. Cl.
CPC .............. *G06F 21/72* (2013.01); *G06F 7/504* (2013.01); *H04L 9/0852* (2013.01)

(58) Field of Classification Search
CPC ....... H04L 9/003; H04L 9/085; H04L 9/0852; H04L 2209/04; H04L 2209/046; G06F 21/72; G06F 2207/7219; G06F 2207/7223; G06F 2207/7233; G06F 2207/7238; G06F 7/501; G06F 7/504; G06F 7/764
See application file for complete search history.

(56) References Cited

U.S. PATENT DOCUMENTS

| | | | |
|---|---|---|---|
| 8,050,402 B2 | 11/2011 | Golic | |
| 10,871,947 B2 | 12/2020 | Hutter | |
| 11,385,893 B2 | 7/2022 | Vigilant | |
| 11,386,239 B2 | 7/2022 | Pulkus | |
| 2009/0112896 A1* | 4/2009 | Golic | ............ H04L 9/003 |
| 2010/0235417 A1* | 9/2010 | Baek | ............ G06F 7/764 |
| | | | 708/236 |
| 2014/0181170 A1* | 6/2014 | Ban | ............ G06F 7/49963 |
| | | | 708/551 |
| 2022/0254428 A1* | 8/2022 | Adham | ............ G11C 29/4401 |
| 2023/0115373 A1* | 4/2023 | Badaroglu | ............ G06N 3/09 |
| | | | 708/670 |
| 2023/0353361 A1 | 11/2023 | Schoenauer et al. | |
| 2023/0367549 A1* | 11/2023 | Schmit | ............ G06F 7/5045 |
| 2023/0396436 A1 | 12/2023 | Azouaoui et al. | |

(Continued)

FOREIGN PATENT DOCUMENTS

| | | |
|---|---|---|
| CN | 104852795 A | 8/2015 |
| CN | 107508663 A | 12/2017 |
| CN | 108604987 A | 9/2018 |

(Continued)

OTHER PUBLICATIONS

Coron, JS., Großschädl, J., Tibouchi, M., Vadnala, P.K. Conversion from Arithmetic to Boolean Masking with Logarithmic Complexity. 2015. In: Leander, G. (eds) Fast Software Encryption. FSE 2015. Lecture Notes in Computer Science(), vol. 9054 (Year: 2015).*

(Continued)

*Primary Examiner* — Jeremy S Duffield

(57) ABSTRACT

A hardware converter configured to convert d arithmetic shares of x to d Boolean shares of x. The hardware converter has a plurality of addition layers in a tree structure. Each layer has a plurality of secure bit adders.

16 Claims, 7 Drawing Sheets

(56) References Cited

U.S. PATENT DOCUMENTS

2024/0015012 A1 1/2024 Bronchain et al.
2024/0272873 A1* 8/2024 Hoffmann ............ H04W 12/47

FOREIGN PATENT DOCUMENTS

EP 2634953 A1 9/2013
EP 3503460 A1 6/2019
KR 20200067414 A 6/2020

OTHER PUBLICATIONS

Biryukov, A., Dinu, D., Le Corre, Y., Udovenko, A. Optimal First-Order Boolean Masking for Embedded IoT Devices. 2018. In: Eisenbarth, T., Teglia, Y. (eds) Smart Card Research and Advanced Applications. Cardis 2017. Lecture Notes in Computer Science(), vol. 10728. (Year: 2018).*
Gao, S., Großschädl, J., Marshall, B., Page, D., Pham, T., & Regazzoni, F. An Instruction Set Extension to Support Software-Based Masking. 2021. IACR Transactions on Cryptographic Hardware and Embedded Systems, 2021(4), 283-325. (Year: 2021).*
U.S. Appl. No. 17/935,550, filed Sep. 26, 2022; Inventor: Melissa Azouaoui et al.; Title: "Protecting Polynomial Rejection Through Masked Compressed Comparison".
Roberto Avanzi, et al., "Crystals-kyber algorithm specifications and supporting documentation," NIST PQC Round 3 (2019), 4.
Florian Bache and Tim Güneysu, "Boolean Masking for Arithmetic Additions at Arbitrary Order in Hardware," Applied Sciences 12 (2022), No. 5.
Gilles Barthe, et al., "Masking the GLP Lattice-Based Signature Scheme at Any Order," Eurocrypt (2), Lecture Notes in Computer Science, vol. 10821, Springer, 2018, pp. 354-384.
Olivier Bronchain and Gaetan Cassiers, "Bitslicing Arithmetic/Boolean Masking Conversions for Fun and Profit with Application to Lattice-based Kems," IACR Trans. Cryptogr. Hardw. Embed. Syst. 2022 (2022), No. 4, 553-588.
Gaetan Cassiers, et al., "Hardware Private Circuits: From Trivial Composition to Full Verification," IEEE Trans. Computers 70 (2021), No. 10, 1677-1690.
Jean-Sebastien Coron, et al., "Secure Conversion Between Boolean and Arithmetic Masking of Any Order," CHES, Lecture Notes in Computer Science, vol. 8731, Springer, 2014, pp. 188-205.
Leo Ducas, et al., "Crystals—Dilithium: Digital signatures from Module Lattices, " IACR Cryptol. ePrint Arch. (2017), 633.
Tim Fritzmann, et al., "Masked Accelerators and Instruction Set Extensions for Post-quantum Cryptography," IACR Trans. Cryptogr. Hardw. Embed. Syst. 2022 (2022), No. 1, 414-460.
Louis Goubin, "A sound method for switching between boolean and arithmetic masking," CHES, Lecture Notes in Computer Science, vol. 2162, Springer, 2001, pp. 3-15.
Dahmun Goudarzi, et al., "Probing security through input-output separation and revisited quasilinear masking," IACR Trans. Cryptogr. Hardw. Embed. Syst. 2021 (2021), No. 3, 599-640.
David Knichel and Amir Moradi, "Low-latency hardware private circuits," IACR Cryptol. ePrint Arch. (2022), 507.
Vincent Migliore, "Masking dilithium—efficient implementation and side-channel evaluation," ACNS, Lecture Notes in Computer Science, vol. 11464, Springer, 2019, pp. 344-362.
Tobias Schneider, et al., "Arithmetic addition over boolean masking—towards first- and second-order resistance in hardware," ACNS, Lecture Notes in Computer Science, vol. 9092, Springer, 2015, pp. 559-578.
Tobias Schneider, et al., "Efficiently masking binomial sampling at arbitrary orders for lattice-based crypto," Public Key Cryptography (2), Lecture Notes in Computer Science, vol. 11443, Springer, 2019, pp. 534-564.

* cited by examiner

US 12,499,277 B2

FLEXIBLE HARDWARE ACCELERATORS FOR MASKING CONVERSIONS WITH A POWER OF TWO MODULUS

FIELD OF THE DISCLOSURE

Various exemplary embodiments disclosed herein relate to flexible hardware accelerators for masking conversions with a power of two modulus.

BACKGROUND

Conversions from arithmetic to Boolean masking as well as from Boolean to arithmetic masking are essential for the secure implementation of various cryptographic algorithms. In particular in the context of post-quantum cryptography (e.g., Kyber and Dilithium), this operation becomes one of the performance bottlenecks of masked designs.

SUMMARY

A summary of various exemplary embodiments is presented below.

Various embodiments relate to a hardware converter configured to convert d arithmetic shares of x to d Boolean shares of x, where x has k bits and the modulus is $2^k$, including: a first plurality of hardware addition layers, each layer including: a second plurality of secure bit adders, wherein the secure bit adders are configured to add two inputs having a third plurality of shares and produce outputs having a third plurality of shares, wherein the number of the third plurality of shares is based upon addition layer, a first input of the secure bit adder includes one half the third plurality of zero last shares, a second input of the secure bit adder includes one half the third plurality of zero first shares, the inputs to the secure bit adders of a first layer include a kth bit of the d arithmetic shares of x, and the inputs to the secure bit adders of remaining layers include the output of a previous layer.

Various embodiments are described, wherein the first plurality of hardware addition layers produce outputs in a single processing cycle.

Various embodiments are described, wherein the inputs of the remaining layers are directly connected to the output of the previous layer.

Various embodiments are described, wherein the secure adders for a first to k−1th bits produce a carry bit that is input into the secure adder for the next bit.

Various embodiments are described, wherein the secure bit adders further include a secure full adder including a first bit input, a second bit input, a carry bit input, an output bit output, and carry bit output, including: a first XOR circuit configured to XOR the first bit input, the second bit input, and the carry bit input to produce the output bit output; a second XOR circuit configured to XOR the second bit input with the carry bit input; a secure AND circuit configured to AND an output of the first XOR circuit with an output of the second XOR circuit; and a third XOR circuit configured XOR the second input bit with an output of the secure AND circuit to produce the carry bit output.

Further various embodiments relate to a hardware converter configured to convert d arithmetic shares of x to d Boolean shares of x, where x has k bits and the modulus is $2^k$, including: a first plurality of hardware addition layers, each layer including: a second plurality of secure bit adders and second plurality of multiplexers, wherein the secure bit adders are configured to add two inputs having a third plurality of shares and produce outputs having a third plurality of shares, a first input of the secure bit adder includes one half the third plurality of zero last shares, a second input of the secure bit adder includes one half the third plurality of zero first shares, the inputs to the secure bit adders of a first layer include a kth bit of the d arithmetic shares of x, the inputs to the secure bit adders of remaining layers include the output of a previous layer, the secure adders include a carry bit input and a carry bit output, the multiplexers receive the carry bit output from their associated secure bit adder and a fixed bit value, an output of multiplexers is connected to the carry bit input of their associated secure bit adder, and the multiplexer outputs the fixed value for the first bit of the d shares of x and the carry output from a prior bit for a second to kth bits.

Various embodiments are described, wherein the secure bit adders further include a secure full adder including a first bit input, a second bit input, a carry bit input, an output bit output, and carry bit output, including: an first XOR circuit configured to XOR the first bit input, the second bit input, and the carry bit input to produce the output bit output; a second XOR circuit configured to XOR the second bit input with the carry bit input; a secure AND circuit configured to AND an output of the first XOR circuit with an output of the second XOR circuit; and a third XOR circuit configured XOR the second input bit with an output of the secure AND circuit to produce the carry bit output.

Further various embodiments relate to a hardware converter configured to convert to d Boolean shares of x to d arithmetic shares of x, where x has k bits and the modulus is $2^k$, including: a random number generator configured to generate d−1 random arithmetic shares of x; a secure hardware arithmetic shares to Boolean shares converter (SecA2B) configure to receive the generated d−1 random arithmetic shares and a dth share that is zero; a secure hardware subtractor configured to securely subtract output shares of the SecA2B from the input d Boolean shares of x; a refresh circuit configured to refresh output shares from the secure hardware subtractor; and an unmask circuit configured to combine output shares of the refresh circuit to produce a dth arithmetic share of x.

Various embodiments are described, where in the SecA2B includes: a first plurality of hardware addition layers, each layer including: a second plurality of secure bit adders, wherein the secure bit adders are configured to add two inputs having a third plurality of shares and produce outputs having the third plurality of shares, a first input of the secure bit adder includes one half the third plurality of zero last shares, a second input of the secure bit adder includes one half the third plurality of zero first shares, the inputs to the secure bit adders of a first layer include a kth bit of the d arithmetic shares of x, and the inputs to the secure bit adders of remaining layers include the output of a previous layer.

Various embodiments are described, wherein the first plurality of hardware addition layers produce outputs in a single processing cycle.

Various embodiments are described, wherein the inputs of the remaining layers are directly connected to the output of the previous layer.

Various embodiments are described, wherein the secure adders for a first to k−1th bits produce a carry bit that is input into the secure adder for the next bit.

Various embodiments are described, wherein the secure adders for kth bits do not produce a carry bit.

Various embodiments are described, the secure bit adders further include a secure full adder including a first bit input, a second bit input, a carry bit input, an output bit output, and carry bit output, including: a first XOR circuit configured to XOR the first bit input, the second bit input, and the carry bit input to produce the output bit output; a second XOR circuit configured to XOR the second bit input with the carry bit input; a secure AND circuit configured to AND an output of the first XOR circuit with an output of the second XOR circuit; and a third XOR circuit configured XOR the second input bit with an output of the secure AND circuit to produce the carry bit output.

Various embodiments are described, where in the SecA2B includes: a first plurality of hardware addition layers, each layer including: a second plurality of secure bit adders and a second plurality of multiplexers, wherein the secure bit adders are configured to add two inputs having a third plurality of shares and produce outputs having a third plurality of shares, a first input of the secure bit adder includes one half the third plurality of zero last shares, a second input of the secure bit adder includes one half the third plurality of zero first shares, the inputs to the secure bit adders of a first layer include a kth bit of the d arithmetic shares of x, the inputs to the secure bit adders of remaining layers include the output of a previous layer, the secure adders include a carry bit input and a carry bit output, the multiplexers receive the carry bit output from their associated secure bit adder and a fixed bit value, an output of multiplexers is connected to the carry bit input of their associated secure bit adder, and the multiplexer outputs the fixed value for the first bit of the d shares of x and the carry output from a prior bit for a second to kth bits.

Various embodiments are described, wherein the secure bit adders further include a secure full adder including a first bit input, a second bit input, a carry bit input, an output bit output, and carry bit output, including: an first XOR circuit configured to XOR the first bit input, the second bit input, and the carry bit input to produce the output bit output; a second XOR circuit configured to XOR the second bit input with the carry bit input; a secure AND circuit configured to AND an output of the first XOR circuit with an output of the second XOR circuit; and a third XOR circuit configured XOR the second input bit with an output of the secure AND circuit to produce the carry bit output.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1A:
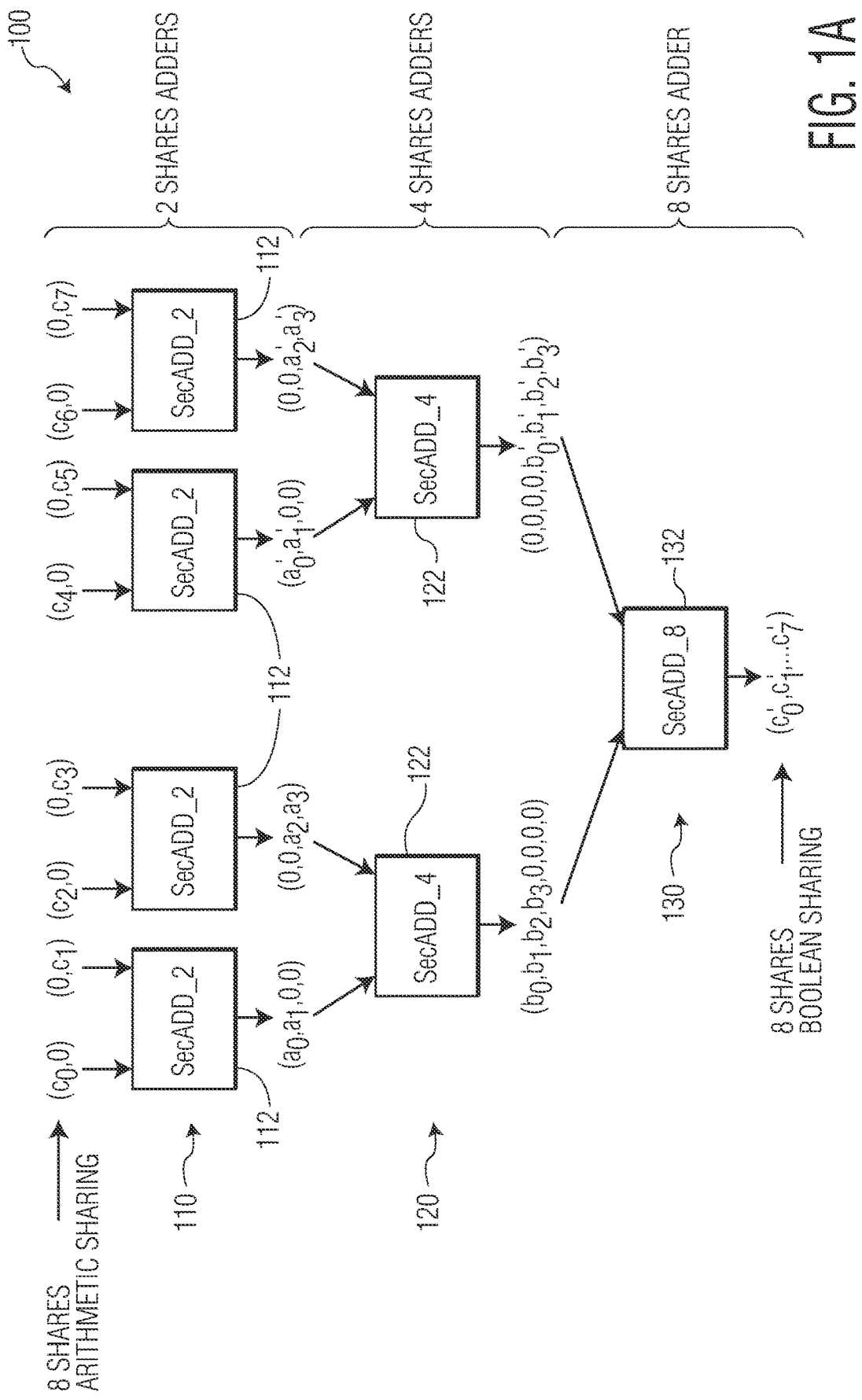
FIG. 1A illustrates a tree structure used to convert 8 arithmetic shares to Boolean shares.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of cryptographic or secure systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Conversions from arithmetic to Boolean masking as well as from Boolean to arithmetic masking are essential for the secure implementation of various cryptographic algorithms. In particular in the context of post-quantum cryptography (e.g., Kyber and Dilithium), this operation becomes one of the performance bottlenecks of masked designs. Prior works commonly implemented these conversions purely in software and only selected publications investigated implementing (parts of) the conversion in dedicated hardware circuits. The proposed hardware circuits are in part restricted to lower security orders or require a significant number of gates or cycles. In this disclosure, a new approach is disclosed to accelerate the conversion in both directions with dedicated hardware, i.e., arithmetic to Boolean and Boolean to arithmetic. This approach may be instantiated at arbitrary security orders, and requires less area and cycles than prior works.

Future cryptographic standards such as the key encapsulation mechanism Kyber or the digital signature scheme Dilithium are based on lattice-based cryptography. (See Roberto Avanzi, Joppe Bos, Leo Ducas, Eike Kiltz, Tancrede Lepoint, Vadim Lyubashevsky, John M Schanck, Peter Schwabe, Gregor Seiler, and Damien Stehle, *Crystals-kyber algorithm specifications and supporting documentation*, NIST PQC Round 3 (2019), 4 and Leo Ducas, Tancrede Lepoint, Vadim Lyubashevsky, Peter Schwabe, Gregor Seiler, and Damien Stehle, *CRYSTALS—dilithium: Digital signatures from module lattices*, IACR Cryptol. ePrint Arch. (2017), 633.) Protecting these against physical attacks such as side-channel attacks is a complex problem. A well-known countermeasure against these side-channel attacks is masking, which in the context of aforementioned lattice-based schemes requires a mixture of Boolean and arithmetic masking, as well as conversions between them. It has been shown that the mask conversion from arithmetic to Boolean masking represents a significant performance bottleneck for hardened implementations of these future standards.

Even though it has been shown to be a major bottleneck for masked software implementations, there has been little research into using dedicated hardware to accelerate this operation. Most prior works rely on the higher-order conversion approach in which core building blocks are Boolean-masked arithmetic additions.

In this disclosure, a new hardware architecture is proposed to accelerate conversions from arithmetic to Boolean masking as well as from Boolean to arithmetic masking with a power of two modulus. This new hardware architecture may be instantiated at arbitrary security orders, occupies significantly less hardware resources than prior works, and is flexibly configurable allowing trade-offs between area, latency, and throughput. The proposed design may be used either in a full hardware implementation or as a software/hardware design to speed up the expensive masking conversions. Overall, the proposed new architecture improves on the state-of-the-art enabling a significantly more efficient hardened implementation of post-quantum cryptographic schemes (and others that require mask conversions).

The proposed architecture builds on the composition of Boolean addition circuits, that has been specifically optimized for use in mask conversions, which results in a much more efficient usage of the underlying hardware. A feature of the proposed architecture is that the latency of the hardware-accelerated conversion is independent of the number of shares. Additionally, all hardware gadgets and registers are fully used at every cycle. Hence, there is no stalling of the hardware coprocessor implementing the conversions. This intrinsically reduces the area and maximizes the throughput. This may be achieved by leveraging ripple-carry adders fulfilling the probe-isolating non-interference (PINI) security property. These adders may be chained securely with zero latency in an optimized conversion tree.

Masking protects an intermediate variable x against side-channel attacks by splitting it into d share and replacing all manipulations on x by manipulations on the d shares. Each share is uniformly distributed such that any combination of d−1 is independent of x. Therefore, a side-channel attacker needs to extract information about all d share to recover x. Masked implementations of post-quantum cryptography commonly require two types of masking, namely arithmetic and Boolean masking.

For arithmetic masking, a sensitive variable $x \in \mathbb{Z}_p$ is split into d shares $x_i^{A_p} \in \mathbb{Z}_p$, $0 \leq i < d$ with $$x = \sum_{i=0}^{d-1} x_i^{A_p} \bmod p.$$

The ensemble of d shares of x is denoted as the arithmetic sharing $x^{A_p} \in \mathbb{Z}_p^d$. Note that the modulus p for arithmetic masking can be chosen arbitrarily and is usually fixed by the target algorithm. However, there are distinct differences for conversion algorithms depending on if p is a power of two. In the embodiments described herein, the focus is on the conversion from arithmetic masking with a power-of-two modulus.

Boolean masking enables the protection of a k-bit variable x. The ensemble of the d shares of x is denoted as the Boolean sharing $x^{B,k}$, and the i-th share is denoted as $x_i^{B,k}$. The sharing of the j-th bit of x is denoted as $x^{B,k}[j]$. The relation between x and its shares is given as $$x = \bigoplus_{i=0}^{d-1} x_i^{B,k},$$

where $\oplus$ denotes a bitwise exclusive OR (XOR).

Next, one approach is described to perform arithmetic addition between two k-bit variables x and y that are both Boolean masked as $x_i^{B,k}$ and $y_i^{B,k}$. Note that there are other solutions to achieve the same computational result, e.g., using a different addition circuit. The embodiments described herein rely on an addition circuit described in the subsequent paragraphs, which allows for optimization in the context of mask conversion.

The basic building blocks are masked full adders denoted as SecFullAdder$^d$ described in Algorithm 1 below. Given two masked input bits ($x^{B,1}$, $y^{B,1}$) and a masked carry-in $z^{B,1}$, the component securely computes the sum w=x+y+z in a masked fashion outputting the masked sum bit $w^{B,2}[0]$ and the masked carry-out $w^{B,2}[1]$. The embodiments described herein are mostly independent of the actual instantiation of this gadget. The gadget is required to fulfill the PINI security property and to produce the masked sum bit with zero latency. One such instantiation is given in Algorithm 2 based on the software-oriented implementation, where SecAnd$_1^d$ denotes the PINI-secure bitwise AND of two Boolean masked variables $x^{B,k}$ and $y^{B,k}$.

These 1-bit full adders can then be chained to perform an addition of k-bit variables, commonly denoted as a ripple-carry adder. Algorithm 2 represents an exemplary instantiation of such a masked ripple-carry adder (SecAdd$_k^d$), which is in line with prior descriptions of such a primitive, e.g., for low security orders.

---

Algorithm 1 – SecFullAdder$^d$
Input: Boolean sharing $x^{B,1}$, $y^{B,1}$, and $z^{B,1}$.
Output: Boolean sharing $w^{B,2}$
such that w = x + y + z.

1:    $a^{B,1} \leftarrow x^{B,1} \oplus^B y^{B,1}$
2:    $w^{B,2}[0] \leftarrow z^{B,1} \oplus^B a^{B,1}$
3:    $w^{B,2}[1] \leftarrow x^{B,1} \oplus^B \text{SecAnd}_1^d(a^{B,1}, x^{B,1} \oplus^B z^{B,1})$ ▷ PINI SecAnd ---
Algorithm 2 – $\text{SecAdd}_k^d$ Input: Boolean sharing $x^{B,k}$ and $y^{B,k}$, such that $x, y \in [\![0, 2^k[\![$.

Output: Boolean sharing $z^{B,k}$ such that $z = x + y \mod 2^k$.
---

Figure 1B:
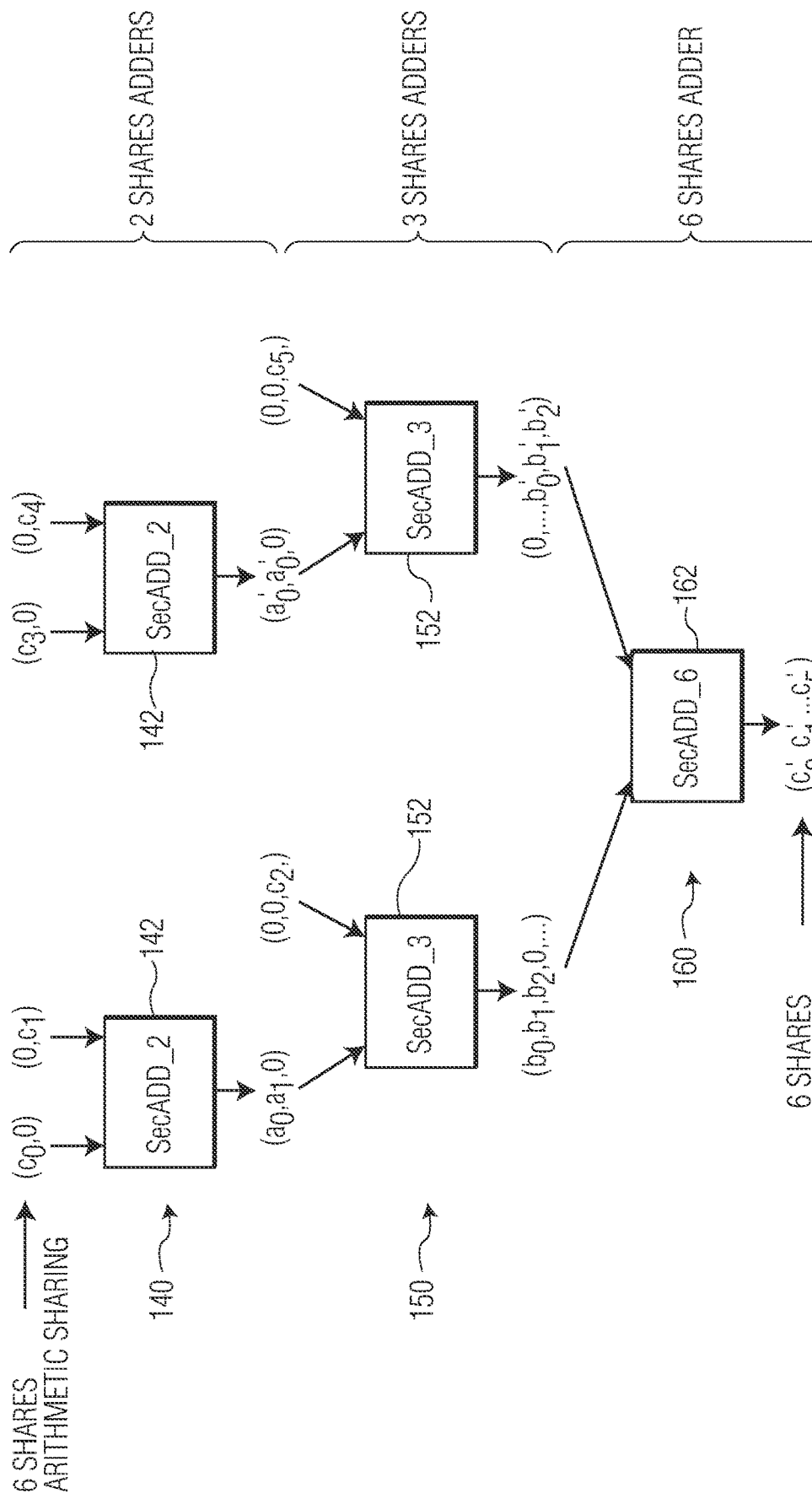
FIG. 1B illustrates a tree structure used to convert 6 arithmetic shares to Boolean shares.

1: $c^{B,1} \leftarrow (0,0, \ldots ,0)$
2: for $i = 0$ to $k - 2$ do
3:     $t^{B,2} \leftarrow \text{SecFullAdder}^d(x^{B,k}[i], y^{B,k}[i], c^{B,1})$     ▷ Algorithm 1
4:     $(z^{B,k}[i], c^{B,1}) \leftarrow (t^{B,2}[0], t^{B,2}[1])$
5: $z^{B,k}[k-1] \leftarrow x^{B,k}[k-1] \oplus^B y^{B,k}[k-1] \oplus^B c^{B,1}$ In order to use Boolean and arithmetic masking to protect a given implementation, masking conversion are required. Most works rely on the arithmetic to Boolean conversion proposed by Coron et al. (Jean-Sebastien Coron, Johann Großschädl, and Praveen Kumar Vadnala, *Secure conversion between boolean and arithmetic masking of any order*, CHES, Lecture Notes in Computer Science, vol. 8731, Springer, 2014, pp. 188-205) or one of its variations (Gilles Barthe, Sonia Belaid, Thomas Espitau, Pierre-Alain Fouque, Benjamin Gregoire, Melissa Rossi, and Mehdi Tibouchi, *Masking the GLP lattice-based signature scheme at any order*, EUROCRYPT (2), Lecture Notes in Computer Science, vol. 10821, Springer, 2018, pp. 354-384 and Olivier Bronchain and Gaetan Cassiers, *Bitslicing arithmetic/boolean masking conversions for fun and profit with application to lattice-based kems*, IACR Trans. Cryptogr. Hardw. Embed. Syst. 2022 (2022), no. 4, 553-588.). The underlying idea is to sum the arithmetic shares using Boolean masked additions. This is computed following a tree-like structure with increasing number of shares in each layer, as depicted in FIG. 1A. FIG. 1A illustrates a tree structure used to convert 8 arithmetic shares to Boolean shares. The SecADD_N function sums two Boolean sharings with N Boolean shares using Boolean masked additions. A first layer 110 includes four SecADD_2 functions 112 that each receive two arithmetic shares from the total of eight arithmetic shares ($c_0, c_1, \ldots c_8$). A second layer 120 includes two SecADD_4 functions 122. A third layer 130 includes one SecADD_8 function 132 that produces the eight Boolean shares ($c_0', c_1', \ldots c_8'$). Using a power of 2 number of shares leads to a complete tree. Other number of shares may be used as well. FIG. 1B illustrates a tree structure used to convert 6 arithmetic shares to Boolean shares. In FIG. 1B the first layer 140 processes shares $c_0, c_1, c_3,$ and $c_4$ using two SecADD_2's 142. Then in the second layer 150 the shares $c_2$ and $c_5$ are processed using two SecADD_3's 152, and the output at the third layer 160 is the 6 Boolean shares from the SecADD_6 162.

The masked converter disclosed herein builds on this conversion solution, as the lack of refresh allows for the efficient composition of the additions in hardware. Note that the special case of a power-of-two modulus $p=2^k$ is focused on, as otherwise further processing steps between the tree layers are required. A straight-forward hardware implementation of Algorithm 3 and Algorithm 5 would instantiate the calls to $\text{SecAdd}_k^d$ with a generic PINI-secure Boolean addition circuits, similar to prior works. Assuming parallel addition circuits for the lower levels, the latency of such a solution would be bounded by the number of layers times the latency of $\text{SecAdd}_k^d$. Therefore, the latency of the complete conversion is increasing with the number of shares according to a scaling factor of $\log_2(d)$.

---
Algorithm 3 – $\text{SecA2B}_k^d$

Input: d shares arithmetic sharing $x^A{}_2^k$, such that $x \in [\![0, 2^k[\![$.

Output: d share Boolean sharing $z^{B,k}$ such that $z = x$.
---

1: if $d = 1$ then
2:     $z^{B,k} \leftarrow x^A{}_2^k$
3: else
4:     $y^{B,k} \leftarrow \text{SecA2B}_k^{\lfloor d/2 \rfloor}(x^A{}_2^k[\![0, 2^k, \lfloor d/2 \rfloor[\![2^k])$     ▷ $\lfloor d/2 \rfloor$ sharing.
5:     $y'^{B,k} \leftarrow \text{SecA2B}_k^{d-\lfloor d/2 \rfloor}(x^A{}_2^k[\![\lfloor d/2 \rfloor, d[\![)$     ▷ $d - \lfloor d/2 \rfloor$ sharing.
6:     $s^{B,k} \leftarrow (y_0^{B,k}, y_1^{B,k}, \ldots, y_{\lfloor d/2 \rfloor-1}^{B,k}, 0, \ldots, 0)$     ▷ Expand to d shares.
7:     $s'^{B,k} \leftarrow (0, \ldots, 0, y'_{\lfloor d/2 \rfloor}^{B,k}, \ldots, y'_{d-1}^{B,k})$     ▷ Expand to d shares.
8:     $z^{B,k} \leftarrow \text{SecAdd}_k^d(s^{B,k}, s'^{B,k})$     ▷ Use Algorithm 2.

Similarly to arithmetic-to-Boolean conversions, Boolean to arithmetic mask conversions are based on variations of the one proposed by Coron et al. Namely we refer to the PINI-secure version of $\text{SecB2A}_k^d$ proposed by Bronchain et al and recalled in Algorithm 4 described below. Note that, $\text{RefreshIOS}_k^d(b^{B,k})$ denotes the refresh from Dahmun Goudarzi, Thomas Prest, Matthieu Rivain, and Damien Vergnaud, *Probing security through input-output separation and revisited quasilinear masking*, IACR Trans. Cryptogr. Hardw. Embed. Syst. 2021 (2021), no. 3, 599-640 and $\text{UnMask}_k^d(c^{B,k})$ denotes an unsharing by adding all the shares together. The notation $\xleftarrow{\$} \mathbb{Z}_{2^k}$ denotes sampling of uniform elements in $\mathbb{Z}_{2^k}$. The masked converter disclosed herein is independent of the concrete instantiation of these gadgets as long as the security properties are fulfilled. Concretely, it is observed that this solution leverages the $\text{SecA2B}_k^d$ that is detailed above (hence in the masked converter disclosed herein, $\text{SecB2A}_k^d$ is built on top of $\text{SecA2B}_k^d$ from the masked converter disclosed herein). To optimize hardware implementations, a new version of $\text{SecB2A}_k^d$ is introduced in Algorithm 5 denoted as $\text{HW-SecB2A}_k^d$ which leverages $\text{SecSub}_k^d$ (see Algorithm 6) instead of the $\text{SecAdd}_k^d$. This small modification removed the need to negate all the shares of $z^{A,k}$ leading to more efficient hardware designs.

---
Algorithm 4 – $\text{SecB2A}_k^d$

Input: d shares Boolean sharing $x^{B,k}$ and $x \in [\![0, 2^k[\![$.

Output: d shares arithmetic sharing $z^A{}_k$ such that $z = x$.
---

1: for $i = 0$ to $d - 2$ do
2:     $z_i^A \xleftarrow{\$} \mathbb{Z}_{2^k}$     ▷ Sample random elements over $z_i^A{}_k$
3:     $z'_i^A{}_k \leftarrow -z_i^A$
4:     $z'_{d-1}^A{}_k \leftarrow 0$
5:     $a^{B,k} \leftarrow \text{SecA2B}_k^d(z'^A{}_k)$
6:     $b^{B,k} \leftarrow \text{SecAdd}_k^d(a^{B,k}, x^{B,k})$
7:     $c^{B,k} \leftarrow \text{RefreshIOS}_k^d(b^{B,k})$
8:     $z_{d-1}^A{}_k \leftarrow \text{UnMask}_k^d(c^{B,k})$ ---
Algorithm 5 – HW – SecB2A$_k^d$
Input: d shares Boolean sharing x$^{B,k}$ and x ∈ $[\![0, 2^k[\![$.
Output: d shares arithmetic sharing z$^A_k$ such that z = x.
---

1:  for i = 0 to d − 2 do
2:     $z_i^A{}_k \xleftarrow{\$} \mathbb{Z}_{2^k}$    ▷ Sample random elements over $z_i^A{}_k$.
3:     $z'_{d-1}{}^A_k \leftarrow 0$
4:     $a^{B,k} \leftarrow \text{SecA2B}_k^d(z'^A_k)$
5:     $b^{B,k} \leftarrow \text{SecSub}_k^d(a^{B,k}, x^{B,k})$
6:     $c^{B,k} \leftarrow \text{RefreshIOS}_k^d(b^{B,k})$
7:     $z_{d-1}{}^A_k \leftarrow \text{UnMask}_k^d(c^{B,k})$ ---
Algorithm 6 – SecSub$_k^d$
Input: Boolean sharing x$^{B,k}$ and y$^{B,k}$, such that x, y ∈ $[\![0, 2^k[\![$.
Output: Boolean sharing z$^{B,k}$ such that z = x − y mod $2^k$.
---

1:  $c^{B,1} \leftarrow (1, 0, \ldots, 0)$
2:  for i = 0 to k − 2
3:     $t^{B,2} \leftarrow \text{SecFullAdder}^d(x^{B,k}[i], \neg y^{B,k}[i], c^{B,1})$   ▷ Algorithm 1
4:     $(z^{B,k}[i], c^{B,1}) \leftarrow (t^{B,2}[0], t^{B,2}[1])$
5:  $z^{B,k}[k-1] \leftarrow x^{B,k}[k-1] \oplus^B y^{B,k}[k-1] \oplus^B c^{B,1}$ Two variants will now be described to implement an arithmetic (with power of two modulus) to Boolean mask conversion efficiently in hardware. To this end, a high-level hardware description of the full added building block SecFullAdder$^d$ for arbitrary number of shares d is introduced. Based on this, two hardware-optimized designs of the conversion are presented denoted as HW[speed]–SecA2B$_k^d$ and HW[area]–SecA2B$_k^d$, where the former is optimized for high-speed and the latter for low area. Afterwards, the key performance metrics are summarized for each of the architectures and compared to the straight-forward approach of instantiating SecAdd$_k^d$ with generic Boolean addition circuits. Finally, both HW[speed]–SecA2B$_k^d$ and HW[area]–SecA2B$_k^d$ are leveraged to build the Boolean to arithmetic masking conversion hardware architecture HW[speed]–SecB2A$_k^d$ and HW[area]–SecB2A$_k^d$.

Figure 2:
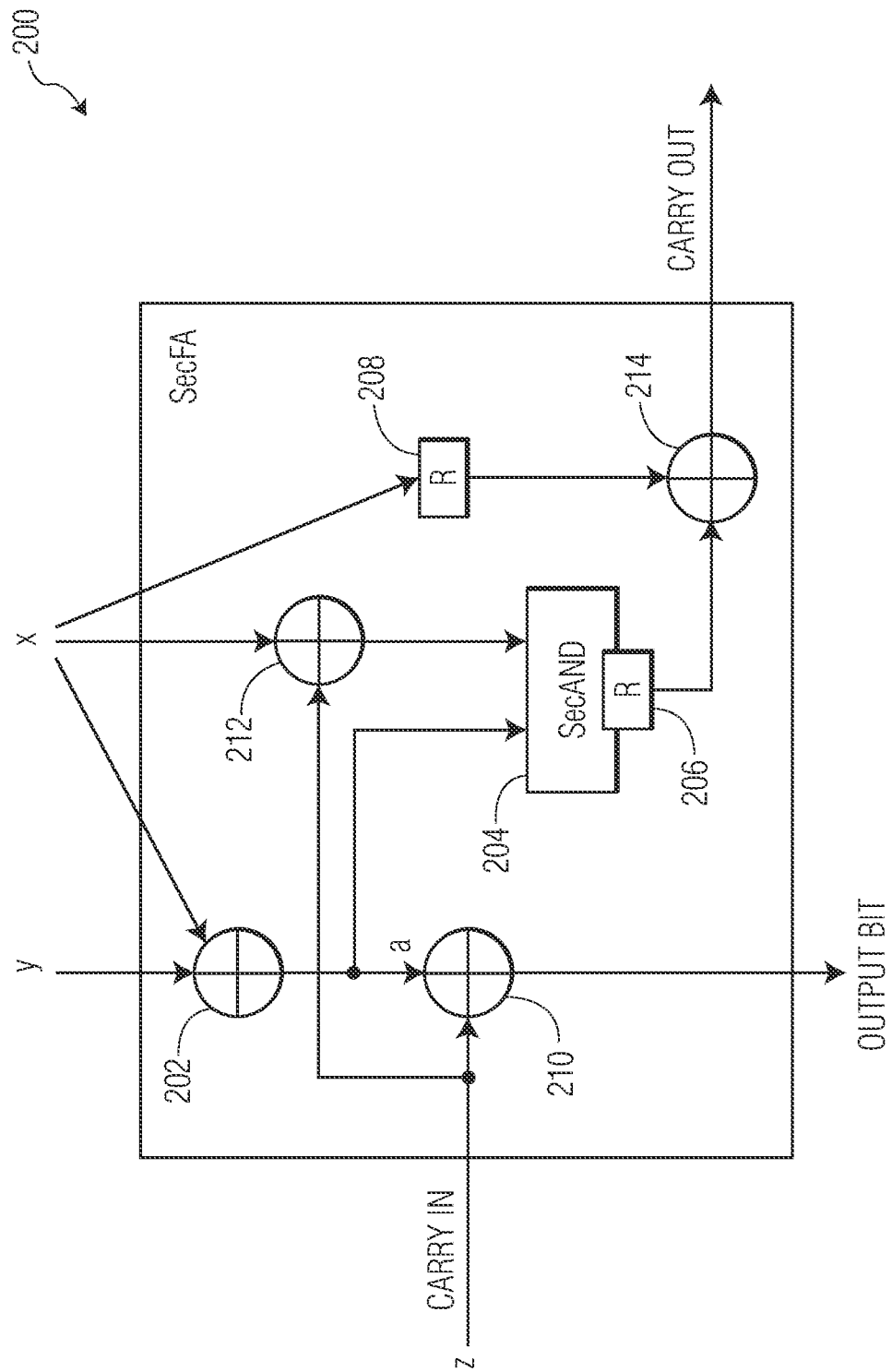
FIG. 2 illustrates one exemplary instantiation of such an adder SecFullAdderd.

For the conversion circuit, Boolean masked full adder modules are used that may compute the masked sum bit with zero latency and are PINI-secure. FIG. 2 illustrates one exemplary instantiation of such an adder SecFullAdder$^d$ 200 based on the description given in Algorithm 1. Concretely, it is based on secure masked XOR gates 202, 210, 212, 214 that have a zero-cycle latency and a single SecAnd$^d$ gate 204. These SecAnd$^d$ gates 204 have a latency of r' as illustrated by the register R 206 at its output. Depending on the instantiation, this latency is typically in the range 1≤r'≤3 for arbitrary number of shares d. The register 208 indicates a delay of the x value into the secure masked XOR gate 202. Note again that the conversion circuit disclosed herein is independent of the concrete implementation of this module, as long as it is PINI-secure. In the following, the performance of the conversion circuit is evaluated based upon the parameters of the SecAnd$^d$ latency r'.

XORs 202 and 210 form a first XOR circuit that XORs the inputs x and y and the carry bit z to produce the output bit. The XOR 212 is a second XOR circuit that XOR's x and z. The SecAND gate 204 securely ANDs a the output of XOR 202 (where a=y⊕x) and the output of XOR 212. The XOR 214 is a third XOR circuit that XORs the output of SecAND gate 204 and a delayed x to produce a carry output.

From this SecFullAdder hardware architecture, it is observed that: 1) the "Output bit" is produced with zero cycles latency because it is only computed from secure share-wise XOR gates; and 2) the carry-bit "Carry out" is produced with r' latency as it requires the computation of a SecAnd$_k^d$. Most of the area is spent on the SecAnd$_k^d$ gate as well as the register R 208 of latency r' used to delay the input x for the final XOR 202.

Figure 3:
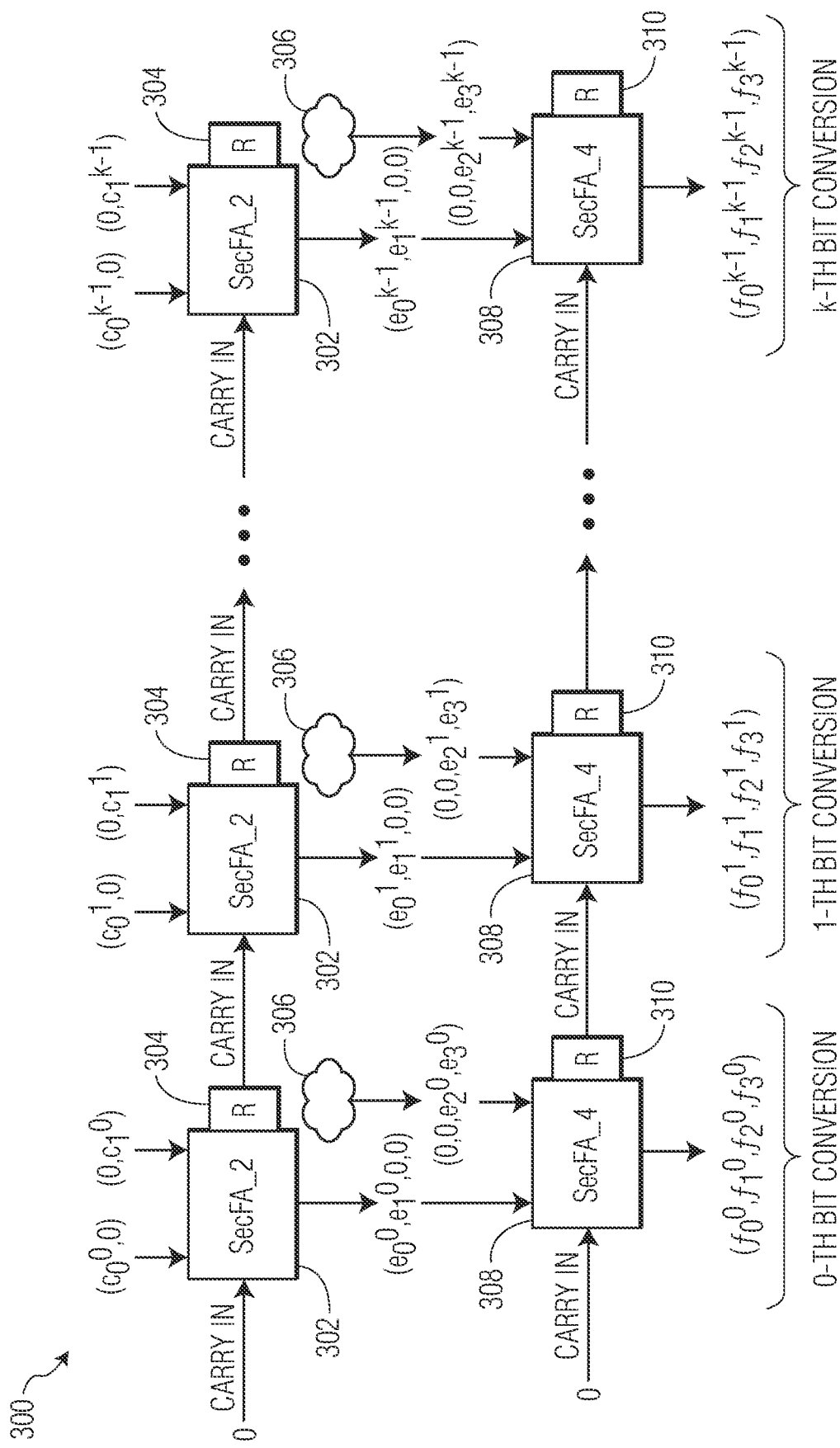
FIG. 3 illustrates an embodiment of a secure adder circuit.

In order to implement the conversion tree in hardware optimized for performance, it is proposed to instantiate multiple SecFullAdder$^d$ in parallel to convert one sharing per cycle thanks to full pipelining as detailed below. This part of the conversion circuit disclosed herein is depicted in FIG. 3 and denoted as HW[speed]–SecA2B$_k^d$ 300.

Each of the tree layers requires masked full adders with a different number of shares d', denoted as SecFullAdder$^{d'}$. For example, if d is a power of two, then the number of independent SecFullAdder$^{d'}$ in one layer for one bit is equal to d/d'. Hence, in the illustration of FIG. 3 for d=4 and d'=2, two instantiations of SecFullAdder$^2$ 302 and 306 are required to process the 0-th bit. Then the outputs of SecFullAdder$^2$ 302 and 304 are processed by SecFullAdder$^4$ 310 to produce the Boolean bit shares ($f_0{}^i$, $f_2{}^i$, $f_3{}^i$, $f_4{}^i$). Here it is notable, that the full adders SecFullAdder$^{d'}$ for the 0-th bit are composed in such a way, that the sum computation (which does not impose a cycle latency) is chained through all layers, i.e., the final converted 0-th bit is available at the output during the first cycle. Within this architecture, the main observation is that two consecutive adders in different layers can be chained with a zero latency. There are no register stages in the computation path that would impact the cycle latency and, therefore, it is independent of the number of shares, in contrast to all prior works. Of course, the critical path increases with the number of shares, as there are more layers to be processed. These layers are directly connected, i.e., the outputs of one layer are directly connected to the inputs of the next layer without any registers.

In order to maximize throughput, it is proposed to instantiate such a computation chain for each bit required for the conversion, e.g., given an arithmetic modulus $2^k$ the conversion circuit composes k bit conversions as described in the previous paragraph. While the converted sum bit of the 0-th bit is produced without latency, the carries for each layer require a latency of r' represented by registers 304 and 308 depending on the concrete instantiation of the PINI-secure SecAnd. Once the carries for bit 0 are computed (which happens in parallel for all layers), they are used as input for the conversion of the 1st input bit. This conversion then does not introduce a cycle latency as before. Note that the last conversion chain does not need to produce a carry-out and, therefore, these SecFullAdder can be implemented without the SecAnd. In the envisioned post-quantum use case, there are many, independent coefficients that need to be converted. These can be fed to this pipelined architecture to achieve a conversion of all coefficients with high throughput as detailed below in the evaluation section.

Figure 4A:
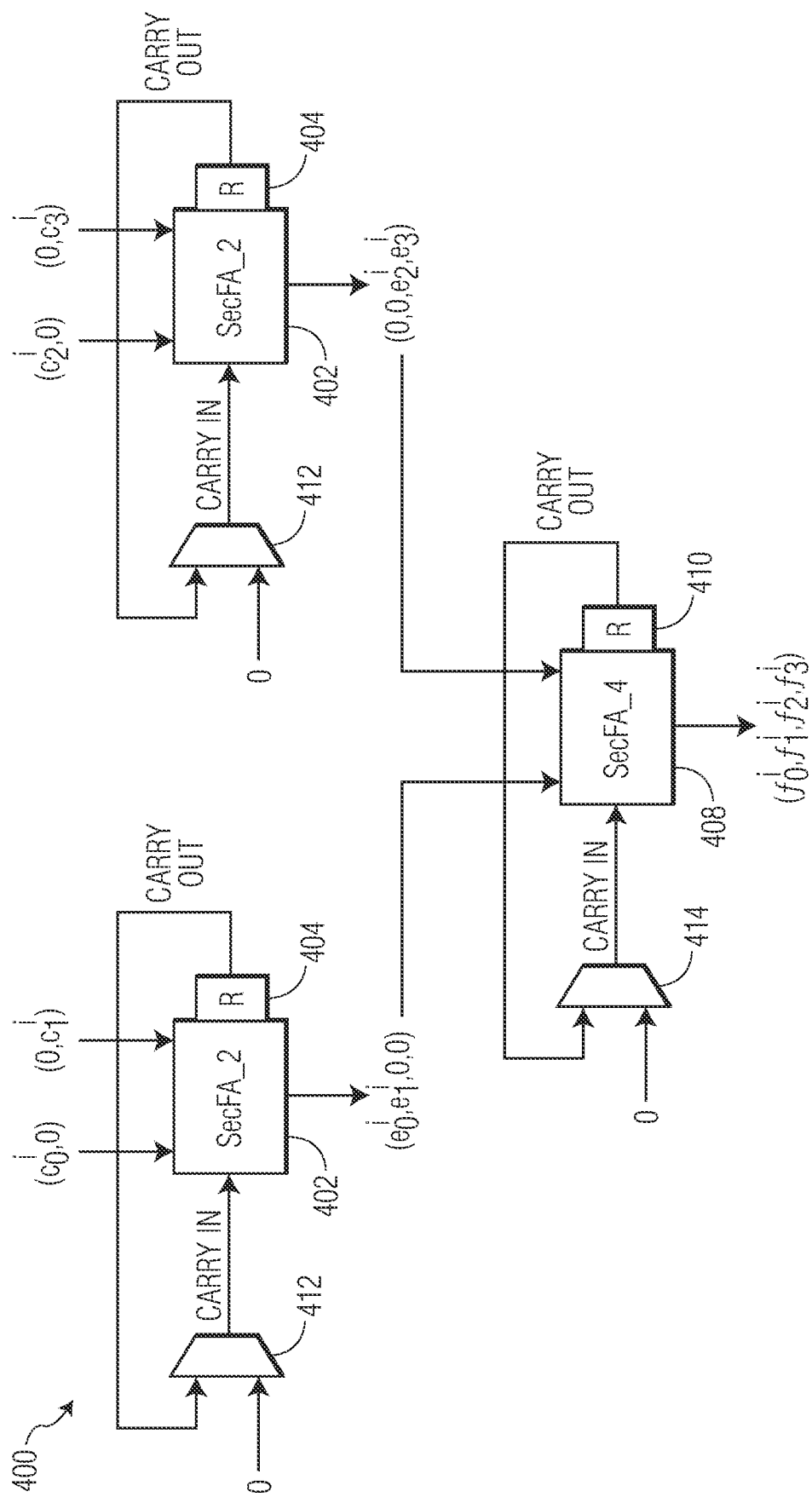
FIG. 4A illustrates an embodiment of a hardware speed optimized hardware converter.
Figure 4B:
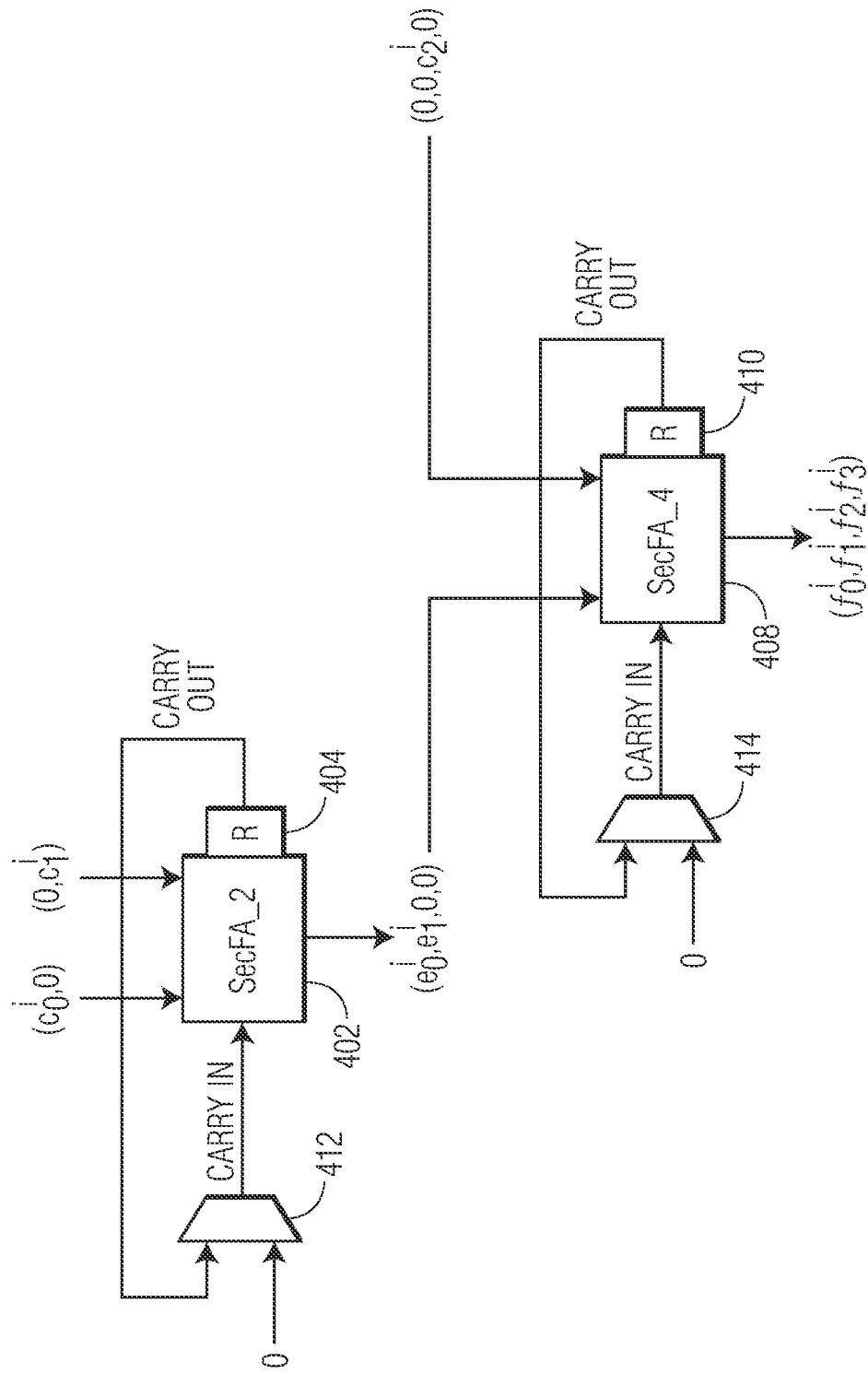
FIG. 4B illustrates another embodiment of a hardware speed optimized hardware converter.

Next, the area optimized hardware conversion is described as presented in FIG. 4A and denoted as HW[area]–SecA2B$_k^d$ 400. As before, it builds on the basic idea that SecFullAdder 402 and 404 of the different conversion layers can be chained with zero cycle latency. However, to optimize for area, the chain is not instantiated for each required bit, but for one bit only. This prevents pipelining, but significantly reduces the amount of required masked full adders and hence circuit area. In this approach, SecFullAdder$^2$ 402 and 404 receives d'=2 shares to produce outputs that are fed into SecFullAdder$^4$ 410. The carry bit from SecFullAdder$^2$ 402 and 404 is fed back into multiplexer 412 to be used in for computing the next bit. The multiplexer 412 outputs 0 when the computation is for the first bit. The registers 404 illustrate the delay present in calculating the carry bit as before. The second layer uses SecFullAdder[4] 408 in a similar manner to produce the Boolean bit shares ($f_0^i$, $f_2^i$, $f_3^i$, $f_4^i$). A first input of the secure bit adder includes 1 zero last share, and a second input of the secure bit adder includes 1 zero first share. This is shown in FIG. 4A as the zero padding of the shares. The secure adders include a carry bit input and a carry bit output. The multiplexers receive the carry bit output from their associated secure bit adder and a fixed bit value (in this example 0, but it could be 1 if a different logic convention is used), and an output of multiplexers are connected to the carry bit input of their associated secure bit adder. The multiplexer outputs the fixed value for the first bit of the d shares of x and the carry output from a prior bit for the second to $k^{th}$ bits. FIG. 4B illustrates how HW[area]–SecA2B$_k^d$ 400 may be implemented to operate on three shares. The architecture of HW[area]–SecA2B$_k^d$ 400 may be expanded to add additional layers as needed to accommodate more shares.

The overall latency is still independent of the number of shares, but now also the area is independent of the modulus used by the arithmetic sharing. Still, HW[area]–SecA2B$_k^d$ requires some additional control logic (e.g., a multiplexer 412 and 414) to feed-back the produced carry. Note that it is possible to flexibly configure the number of bit conversions composed together. FIG. 3 and FIG. 4A-B illustrate the extreme cases for compositions of k and 1 conversion chains. However, it is imaginable to instantiate any number of SecFullAdders between these two cases to allow trading area for throughput.

In the following sections, the performance of the architectures are evaluated according to the parameters presented in Table 1. The first parameter is k–1 which the number of full-adder cells for which a carry bit must be computed. As a result, arithmetic masking with modulus $2^k$ is considered. The number of shares in the input arithmetic masking and output Boolean masking is denoted with d. The latency of the SecAnd$^d$ gate is denoted with r', and finally N is the number of independent masking conversions that need to be performed, e.g., the number of coefficients of a post-quantum scheme. In the context of lattice-based cryptography, often N≥1024 and k≤23.

TABLE 1

| Parameter | Description |
|---|---|
| k | Number of bits. Arithmetic masking with modulus p = $2^k$. |
| d | Number of shares. |
| r' | Induced latency by the masked AND gate. |
| N | Total number of independent conversions, e.g., coefficients. |

First, the performance of HW[speed]–SecA2B$_k^d$ is described. It is noted that the architecture does not contain loops hence SecAnd$^d$ gates can be leveraged with a typical latency of r'=1. Indeed, in such a case, SecAnd$^d$ may be secured against glitch and transition leakages with r'=1. Because the architecture contains k serialized SecFullAdder (or SecAnd), the total latency of the addition is equal to (k–1)·r'. Because one of the N input sharing can be provided to the architecture every cycle, a total of N+r'·(k–1) cycles are required for the full execution. As a result, the throughput is equal to N/(N+r'·(k–1)) which converges to 1 for large enough N (which is the case for typical parameters in lattice-based cryptography).

Second for HW[area]–SecA2B$_k^d$, the performance figures are slightly different. The architecture uses loops hence the SecAnd requires at least r'=2 to be secured against glitch and transition leakage. A single input sharing is processed in (k–1)·r' cycles and r' coefficients can be proposed simultaneously in the architecture (one on each pipeline stage). Putting this all together, a total of N·(k–1)+r' are required to process all the N coefficients. The additional r' is required for the latency of the last SecFullAdder As a result, the throughput of the architecture converges toward 1/(k–1).

Eventually, the previously described architectures offer some area versus performance trade-offs by either increasing the number of serialized SecFullAdder or by duplicating these architectures. In terms of performances, the numbers provided in Table 2 may be adapted to reflect these trade-offs by adapting the N parameter.

TABLE 2

| Parameter | Unit | Speed opt. | Area opt. |
|---|---|---|---|
| r' | Cycles | 1 | 2 |
| Latency | Cycles | N + r' · (k – 1) | N · (k – 1) + r' |
| Throughput | Coeffs/Cycles | N/(N + r' · (k – 1)) ≈ 1 | N/(N · (k – 1) + r') ≈ (1/(k – 1)) |

Both previous architectures HW[area]–SecA2B$_k^d$ 400 and HW[speed]–SecA2B$_k^d$ 300 may be used to build a Boolean to arithmetic masking conversion circuit. The area-optimized architecture HW[area]–SecB2A$_k^d$ 500 is described in FIG. 5. There, it is observed that the HW[area]–SecA2B$_k^d$ 400 is exactly re-used and takes as input random bits generated by a random number generator, and these randomly generated bits are part of the output sharing $z^{4k}$ as required in Algorithm 5. The output of HW[area]–SecA2B$_k^d$ 400 is fed to a SecSub$_k^d$ module 502 composed of a single SecFullAdder$^d$ 508 to match the throughput of the SecA2B$_k^d$ module 400. A NOT operation 504 is performed on the output of HW[area]–SecA2B$_k^d$ 400. SecSub$_k^d$ module 502 also includes a multiplexer 506 to feed back the carry bit and has a register R 510 denoting the delay in the carry bit. Further the multiplexer receives a 1 input to correspond to the NOT function 504. Because the first output bit of SecA2B$_k^d$ is available on the first clock cycle, it can be directly be used by SecSub$_d^k$ which produces the output bit on the same clock cycle. This is similar to adding a layer of adders in the hardware architectures for SecA2B$_k^d$. Then the bits produced by SecSub$_k^d$ are refreshed which implies latency represented by a layer R. To ensure that the bits at the output HW[area]–SecB2A$_k^d$ on a given cycle are part of the same sharing, an additional register layer is used to delay the randomness $z^{4k}$.

Figure 5:
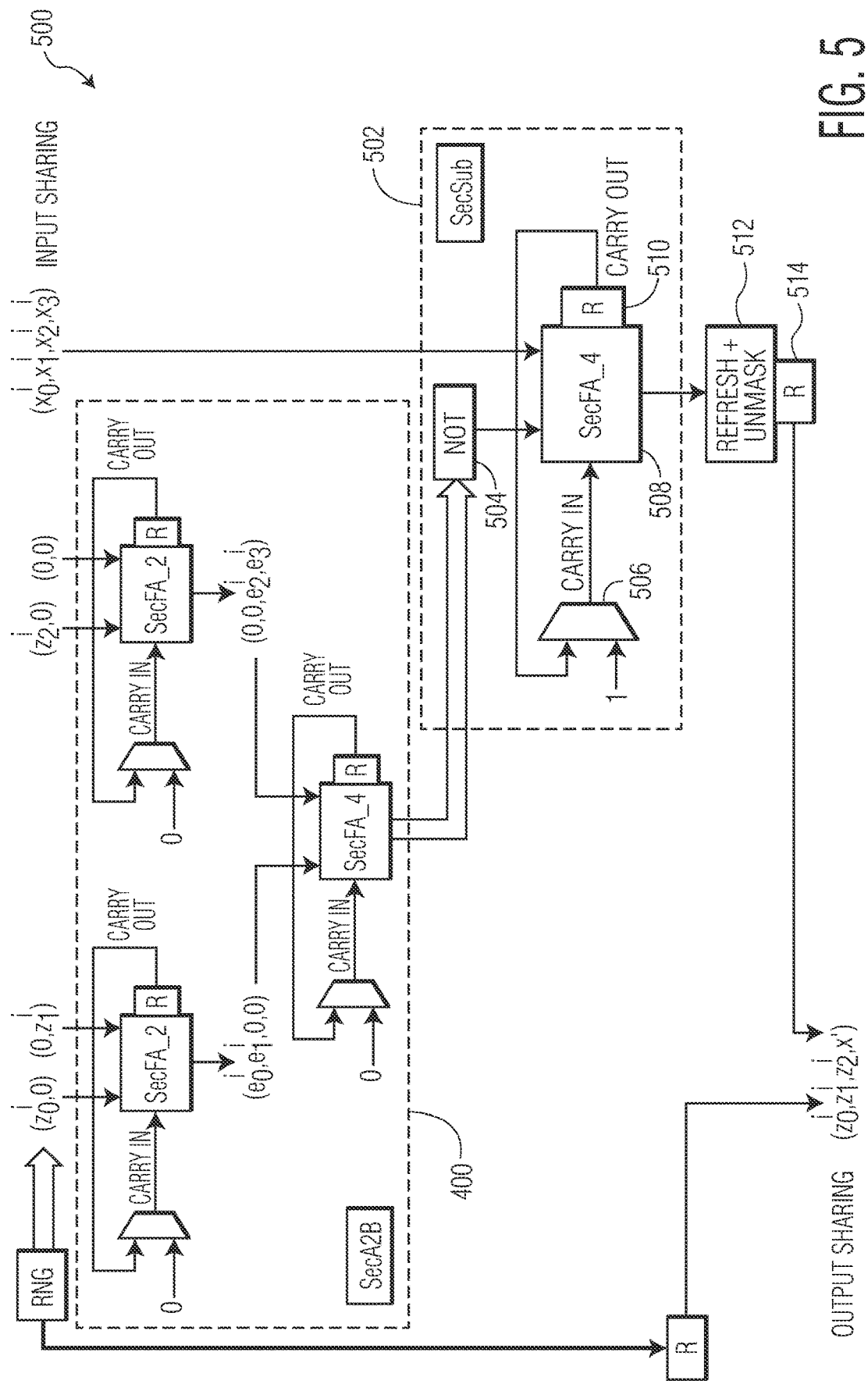
FIG. 5 illustrates another embodiment of a hardware area optimized hardware converter.

To more generally describe the implementation of FIG. 5, HW[area]–SecB2A$_k^d$ 500 converts d Boolean shares of x to d arithmetic shares of x, where x has k bits and d is a power of two. The HW[area]–SecB2A$_k^d$ 500 includes a random number generator configured to generate d–1 random arithmetic shares of x. The HW[area]–SecB2A$_k^d$ 500 includes a secure hardware arithmetic shares to Boolean shares converter (SecA2B) configure to receive the generated d–1 random arithmetic shares and a $d^{th}$ share that is zero. This SecA2B is shown using the implementation of FIG. 4, but the implementation of FIG. 3 may be used as well. The HW[area]–SecB2A$_k^d$ 500 also includes a secure hardware subtractor configured to securely subtract output shares of the SecA2B from the input d Boolean shares of x. The HW[area]–SecB2A$_k^d$ 500 includes a refresh circuit (part of 512) configured to refresh output shares from the secure hardware subtractor. The HW[area]–SecB2A$_k^d$ 500 includes an unmask circuit (part of 512) configured to combine output shares of the refresh circuit to produce the $d^{th}$ arithmetic share of x. This may be done as described above by adding the share together.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A hardware converter configured to convert d arithmetic shares of x to d Boolean shares of x using a modulus of $2^k$, where x has k bits, the hardware converter comprising:
   a first plurality of hardware addition layers, each layer comprising:
   a second plurality of secure bit adders,
   wherein each of the secure bit adders are configured to add a first input and a second input and produce an output having N shares, wherein the number of the N shares is based upon a hierarchical position of an addition layer of the respective secure bit adder in the first plurality of hardware addition layers, wherein N is an integer greater than one,
   the first input of each secure bit adder is N shares, wherein the first N/2 of the shares of the first input are zero shares,
   the second input of each secure bit adder is N shares, wherein the last N/2 of the shares of the second input are zero shares,
   the inputs to each of the secure bit adders of the second plurality of secure bit adders of a first layer include a kth bit of the d arithmetic shares of x, and
   the inputs to each of the secure bit adders of the second plurality of secure bit adders of remaining layers include the output of a previous layer.

2. The hardware converter of claim 1, wherein the first plurality of hardware addition layers produces outputs in a single processing cycle.

3. The hardware converter of claim 1, wherein the inputs of the remaining layers are directly connected to the output of the previous layer.

4. The hardware converter of claim 1, wherein the secure adders for a first to k−1th bits produce a carry bit that is input into the secure adder for the next bit.

5. The hardware converter of claim 1, wherein the secure bit adders further include a secure full adder including a first bit input, a second bit input, a carry bit input, an output bit output, and carry bit output, the secure full adder comprising:
   a first XOR circuit configured to XOR the first bit input, the second bit input, and the carry bit input to produce the output bit output;
   a second XOR circuit configured to XOR the second bit input with the carry bit input;
   a secure AND circuit configured to AND an output of the first XOR circuit with an output of the second XOR circuit; and a third XOR circuit configured to XOR the second input bit with an output of the secure AND circuit to produce the carry bit output.

6. A hardware converter configured to convert d arithmetic shares of x to d Boolean shares of x using a modulus of $2^k$, where x has k bits, the hardware converter comprising:
a first plurality of hardware addition layers, each layer comprising:
a second plurality of secure bit adders and a second plurality of multiplexers, wherein each of the secure bit adders are configured to add a first input and a second input and produce an output having N shares, wherein N is an integer greater than one,
the first input of each secure bit adder is N shares, wherein the first N/2 of the shares of the first input are zero shares,
the second input of each secure bit adder is N shares, wherein the last N/2 of the shares of the second input are zero shares,
the inputs to each of the secure bit adders of the second plurality of secure bit adders of a first layer include a kth bit of the d arithmetic shares of x,
the inputs to each of the secure bit adders of the second plurality of secure bit adders of remaining layers include the output of a previous layer,
each of the secure adders includes a carry bit input and a carry bit output,
the multiplexers receive the carry bit output from a respective associated secure bit adder and a fixed bit value,
a respective output of each of the multiplexers is connected to the carry bit input of the respective associated secure bit adder, and
a first multiplexer of the second plurality of multiplexers outputs the fixed bit value for the first bit of the d shares of x and the remaining multiplexers of the second plurality of multiplexers output the carry output from a prior bit for a second to kth bits.

7. The hardware converter of claim 6, wherein the secure bit adders further include a secure full adder including a first bit input, a second bit input, the carry bit input, an output bit output, and the carry bit output, the secure full adder comprising:
a first XOR circuit configured to XOR the first bit input, the second bit input, and the carry bit input to produce the output bit output;
a second XOR circuit configured to XOR the second bit input with the carry bit input;
a secure AND circuit configured to AND an output of the first XOR circuit with an output of the second XOR circuit; and
a third XOR circuit configured XOR the second input bit with an output of the secure AND circuit to produce the carry bit output.

8. A hardware converter configured to convert d Boolean shares of x to d arithmetic shares of x using a modulus of $2^k$, where x has k bits, comprising:
a random number generator configured to generate d−1 random arithmetic shares of x;
a secure hardware arithmetic shares to Boolean shares converter (SecA2B) configured to receive the generated d−1 random arithmetic shares and a dth share that is zero and to produce SecA2B Boolean output shares using a modulus of $2^k$,
a secure hardware subtractor configured to receive the SecA2B Boolean output shares from the SecA2B and to securely subtract the SecA2B Boolean output shares of the SecA2B from the d Boolean shares of x producing subtracted output shares;
a refresh circuit configured to receive the subtracted output shares from the secure hardware subtractor, and to refresh the subtracted output shares from the secure hardware subtractor producing refreshed output shares; and
an unmask circuit configured to receive the refreshed output shares from the refresh circuit and to combine the refreshed output shares of the refresh circuit to produce the dth arithmetic share of x.

9. The hardware converter of claim 8, wherein the SecA2B comprises:
a first plurality of hardware addition layers, each layer comprising:
a second plurality of secure bit adders,
wherein each of the secure bit adders are configured to add a first input and a second and produce an output having N shares, wherein N is an integer greater than one,
the first input of each secure bit adder is N shares, wherein the first N/2 of the shares of the first input are zero shares,
the second input of each secure bit adder is N shares, wherein the last N/2 of the shares of the second input are zero shares,
the inputs to each of the secure bit adders of the second plurality of secure bit adders of a first layer include a kth bit of the d arithmetic shares of x, and
the inputs to each of the secure bit adders of the second plurality of secure bit adders of remaining layers include the output of a previous layer.

10. The hardware converter of claim 9, wherein the first plurality of hardware addition layers produces outputs in a single processing cycle.

11. The hardware converter of claim 9, wherein the inputs of the remaining layers are directly connected to the output of the previous layer.

12. The hardware converter of claim 9, wherein the secure adders for a first to k−1th bits produce a carry bit that is input into the secure adder for the next bit.

13. The hardware converter of claim 9, wherein the secure adders for kth bits do not produce a carry bit.

14. The hardware converter of claim 9, the secure bit adders further include a secure full adder including a first bit input, a second bit input, a carry bit input, an output bit output, and carry bit output, the secure full adder comprising:
a first XOR circuit configured to XOR the first bit input, the second bit input, and the carry bit input to produce the output bit output;
a second XOR circuit configured to XOR the second bit input with the carry bit input;
a secure AND circuit configured to AND an output of the first XOR circuit with an output of the second XOR circuit; and
a third XOR circuit configured to XOR the second input bit with an output of the secure AND circuit to produce the carry bit output.

15. The hardware converter of claim 8, wherein the SecA2B comprises:
a first plurality of hardware addition layers, each layer comprising:
a second plurality of secure bit adders and a second plurality of multiplexers, wherein each of the secure bit adders are configured to add a first input and a second input and produce an output having N shares, wherein N is an integer greater than one, the first input of each secure bit adder is N shares, wherein the first N/2 of the shares of the first input are zero shares, the second input of each secure bit adder is N shares, wherein the last N/2 of the shares of the second input are zero shares, the inputs to each of the secure bit adders of the second plurality of secure bit adders of a first layer include a kth bit of the d arithmetic shares of x, the inputs to each of the secure bit adders of the second plurality of secure bit adders of remaining layers include the output of a previous layer, each of the secure adders includes a carry bit input and a carry bit output, the multiplexers receive the carry bit output from a respective associated secure bit adder and a fixed bit value, a respective output of each of the multiplexers is connected to the carry bit input of the respective associated secure bit adder, and a first multiplexer of the second plurality of multiplexers outputs the fixed bit value for the first bit of the d shares of x and the remaining multiplexers of the second plurality of multiplexers output the carry output from a prior bit for a second to kth bits.

16. The hardware converter of claim 15, wherein the secure bit adders further include a secure full adder including a first bit input, a second bit input, the carry bit input, an output bit output, and the carry bit output, the secure full adder comprising:

a first XOR circuit configured to XOR the first bit input, the second bit input, and the carry bit input to produce the output bit output;

a second XOR circuit configured to XOR the second bit input with the carry bit input;

a secure AND circuit configured to AND an output of the first XOR circuit with an output of the second XOR circuit; and a third XOR circuit configured to XOR the second input bit with an output of the secure AND circuit to produce the carry bit output.

* * * * *